United States Patent [19]

Keller et al.

[11] Patent Number: 5,772,739
[45] Date of Patent: Jun. 30, 1998

[54] METHOD AND DEVICE FOR TREATING AN ENDLESS WEB OF MATERIAL WITH A WASHING LIQUID

[75] Inventors: Walter Keller, Willich; Christian Meyer, Viersen-Dülken, both of Germany

[73] Assignee: Wet-Tex Maschinenbau GmbH, Tonisvorst, Germany

[21] Appl. No.: 542,389

[22] Filed: Oct. 12, 1995

[30] Foreign Application Priority Data

Oct. 14, 1994 [DE] Germany .......................... 44 36 746.5

[51] Int. Cl.[6] .................................................. D06B 3/06
[52] U.S. Cl. ................................ 95/241; 95/256; 95/288; 96/201; 55/268; 55/269; 8/151; 8/158; 68/18 R; 68/20
[58] Field of Search .......................... 95/241, 256, 261, 95/266, 288; 96/175, 193, 195, 201; 55/268, 269, 276; 8/151, 158; 68/18 R, 20; 162/264, 278, 279, 348, 354, 363, 364

[56] References Cited

U.S. PATENT DOCUMENTS

| | | | |
|---|---|---|---|
| Re. 27,882 | 1/1974 | Burnham, Sr. ............................ | 95/266 |
| 2,571,219 | 10/1951 | De Lew .................................... | 95/266 |
| 3,250,099 | 5/1966 | North et al. ............................... | 68/62 |
| 3,797,281 | 3/1974 | Norton ..................................... | 68/19.1 |
| 3,806,405 | 4/1974 | Heidweiller ................................ | 68/20 |
| 3,927,971 | 12/1975 | Meier-Windhorst ..................... | 8/151.2 |
| 3,997,928 | 12/1976 | Leifeld ..................................... | 8/149.1 |
| 4,329,201 | 5/1982 | Bolton ..................................... | 162/198 |
| 4,398,996 | 8/1983 | Bolton et al. ............................ | 162/198 |
| 4,447,924 | 5/1984 | Bolton et al. ............................ | 8/151 |
| 4,704,140 | 11/1987 | Kujala ..................................... | 95/266 |
| 5,368,096 | 11/1994 | Williams ................................... | 55/268 |
| 5,419,391 | 5/1995 | Chan et al. ............................... | 165/159 |
| 5,513,417 | 5/1996 | Kim et al. ................................. | 55/276 |

FOREIGN PATENT DOCUMENTS

| | | |
|---|---|---|
| 3102408 | 9/1982 | Germany . |
| 3311707 | 10/1983 | Germany . |
| 2706162 | 8/1984 | Germany . |
| 3818414 | 5/1992 | Germany . |
| 4211055 | 10/1993 | Germany . |

OTHER PUBLICATIONS publication "Textilveredlung", 1994, Issue 7/8, pp. 185–186.

*Primary Examiner*—Jay H. Woo
*Assistant Examiner*—Minh-Chau T. Pham
*Attorney, Agent, or Firm*—Horst M. Kasper

[57] ABSTRACT

A method and a device are provided for the treatment of an endless web of fabric with a washing liquid and employing a vacuum. The treatment medium is withdrawn from the treatment zone and the withdrawn treatment medium is separated in a cyclone into a gas and a liquid. The liquid is pumped back into the treatment zone. The gas is heated additionally in a vacuum generator and is then returned into the treatment zone.

25 Claims, 2 Drawing Sheets

METHOD AND DEVICE FOR TREATING AN ENDLESS WEB OF MATERIAL WITH A WASHING LIQUID

BACKGROUND OF THE INVENTION

1. Field of the Invention

The invention relates to a method and apparatus for the treatment of an endless web of material or fabric, in particular for the washing of an endless web of textile material, with a vacuum, wherein the heated treatment medium is withdrawn from the treatment zone, wherein the gas contained in the treatment medium is separated, and wherein the remaining liquid is returned into the treatment zone.

2. Brief Description of the Background of the Invention Including Prior Art

An endless web of fabric is led through a heated washing liquid of a washing machine in such a process. The gas-water mixture, formed within the washing machine, is led to the outside and is then separated into a gaseous phase and into a liquid phase. The liquid phase is returned to the washing machine. The hot gas phase is discharged unused. The thermal energy thereby discharged is lost to the washing liquid in the washing machine, which means a substantial cooling of the washing liquid and a high energy loss. The gas phase, discharged into the open air, impairs and affects the environment and represents a load for the environment. When the liquid is sucked off by way of a vacuum, a part of the liquid is transferred into the gaseous phase based on the decrease of the pressure in the vacuum and the therewith associated lowering of the boiling point, and passes in the gaseous phase with the energy contained therein together with the remaining gas phase unused into the atmosphere. It has not been possible with simple means to make use of the energy present in the gas up to now.

The German Patent document DE 2,706,162 to Paul Marchal et al. teaches a plant for the continuous heat treatment of a material to be treated, where said material runs through a chamber.

The German Patent document DE 3,102,408 to Vepa AG teaches a water extraction apparatus based on sucking the liquid from a textile material or the like.

The German Patent document DE 3,311,707 to Jeffrey Paul Bachand et al. teaches a device and a process for the chemical treatment of a cloth or fabric material.

The German Patent document DE 3,818,414 to Wilhelm Christ teaches a method and a device for the application of softener onto textile materials.

The German Patent document DE 4,211,055 to Hellmut Beckstein et al. teaches an open-width washing machine or a full-width washing machine.

The publication "Textilveredlung", 1994, Issue 7/8, teaches on page 185, bottom of third column, to page 186, upper part of first column, a process for the washing of materials, where the washing represents a transporting away of the separated slashing product or sizing product.

SUMMARY OF THE INVENTION

1. Purposes of the Invention

It is an object of the present invention to avoid the disadvantages of the conventional apparatuses for washing an endless web as well as to create a method and a device which allows to recover the expended energy nearly completely and which improves the effect of the treatment.

These and other objects of and advantages of the present invention will become evident from the description which follows.

2. Brief Description of the Invention

According to the present invention, there is provided for a method for a treatment of an endless web of fabric and for washing a continuous textile web. An endless web of fabric is treated with a heated treatment medium. A generated gas-liquid mixture is withdrawn from a treatment zone with a vacuum generator. A gas-liquid mixture, generated above the treatment medium, is separated into a gas phase and a remaining liquid phase outside of the treatment zone. The separated remaining liquid phase is pumped back into the treatment zone. The remaining gas phase is led to a vacuum generator. The remaining gas phase is returned from the vacuum generator to the treatment zone.

The present invention further provides for an apparatus for a treatment of an endless web of fabric with a washing liquid. Guiding means including rollers are provided for supporting an endless web of fabric. A treatment machine is disposed in a path of the guiding means and for treating the endless web of fabric. The treatment machine is furnished with a heated treatment medium. A first line is connected to the treatment machine. A gas-liquid separator is connected to the first line for discharging the gas-liquid mixture. A gas discharge line is connected to a head of the gas-liquid separator. A liquid line is connected to the floor of the gas-liquid separator. A vacuum generator is connected to the gas discharge line. A pump is connected to the liquid line. A second liquid line is connected to the pump and to the treatment machine. A gas return line is connected to the vacuum generator and to the treatment machine.

The treatment machine can be a washing machine. A branch line can be connected to the gas return line. A perforated pipe can be disposed in the treatment medium and connected to the gas return line. The gas return line can be entered above the treatment medium into the treatment machine. There can be provided a heat exchanger having a floor. A second branch line can enter with a perforated tube into the floor of the heat exchanger. A fresh water feed can be connected to the heat exchanger. A distributor plate with openings can be furnished to the heat exchanger. A discharge line for hot liquid can be connected to the heat exchanger and can be furnished in an area of the distributor plate. An exhaust line can be connected to the heat exchanger, located above the distributor plate and led into the outside open air.

In accordance with the present invention, the treatment medium is separated into a gas phase and a liquid phase, the liquid is withdrawn and is pumped back into the treatment zone, and the gas is led through a vacuum generator and then returned into the treatment zone.

Based on the invention method, the hot liquid together with its complete heat content is returned nearly without losses into the treatment zone. An additional energy is to be provided for the vacuum generator, for example, the installed drive power of the motor which is from about 10 to 50 kW. Based on this additional energy, the gaseous phase is further heated in the vacuum generator based on the friction losses occurring in the vacuum generator. The return of the additionally heated gas improves not only the energy use, but it is associated also with an improved treatment effect. The hot gas, generated and entered into the treatment zone, creates a strong turbulence in the treatment zone, in particular when the gas is introduced immediately into the treatment medium. Such a process means a substantially improved washing effect in connection with a washing machine.

In order to improve the energy use further, it is disclosed in accordance with the invention that the gas, withdrawn from the vacuum generator, is returned completely or in part in a microfinely distributed form into a heat exchanger, furnished with a water feed, and the hot liquid thereby generated is led completely or in part to a user, or is completely or in part returned into the treatment zone, and the generated exhaust air is led completely or in part into the open.

A part of the treatment medium is lost during the treatment of the continuous web of fabric. This loss has to be substituted by the addition of a fresh medium, for example, fresh washing water.

The hot gas branched off from the vacuum generator is returned in a very finely distributed form into the liquid bath of the heat exchanger or directly into the treatment medium. The heat contained in the gas is transferred nearly completely to the liquid medium, is led into the treatment zone, or led to another user. The remaining, substantially cooled air can then be led without problem into the open. The remaining, substantially cooled air can also be completely or partially led into the treatment zone.

In order to avoid noise pollution, the gas withdrawn from the vacuum generator is led through a sound absorber.

An apparatus for performing the invention method starts with a treatment machine for the treatment of a continuous fabric web, where the continuous fabric web can be led over rollers and through the treatment machine, furnished with a heated treatment medium, wherein the generated gas-liquid mixture is withdrawn and separated. Another feature is present in that a line with a cyclone or the like is connected to the discharge of the gas-liquid mixture, where the cyclone is furnished in the head with a gas discharge line and in the floor with a liquid line. The gas discharge line is connected to a vacuum generator and the liquid line, furnished with a pump, is connected to the treatment machine. A gas return line is disposed between the vacuum generator and the treatment machine.

The gas return line can be subdivided such that a part of the gas is led directly into the treatment medium and the remaining part is led above the treatment medium into the treatment machine.

A further inventive step comprises that the gas return line, coming from the vacuum generator, is furnished with a branch line. The branch line is introduced in the area of the floor of the heat exchanger, furnished with a feed of fresh water, by way of a distributor plate having uniformly distributed perforation openings of a diameter of from about 0.05 to 2.00 mm. A discharge line for the hot liquid is furnished in the area of the distributor plate. An exhaust air line leading into the outside open air is furnished above the distributor plate.

The invention method can be performed in a most simple way based on the invention device.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
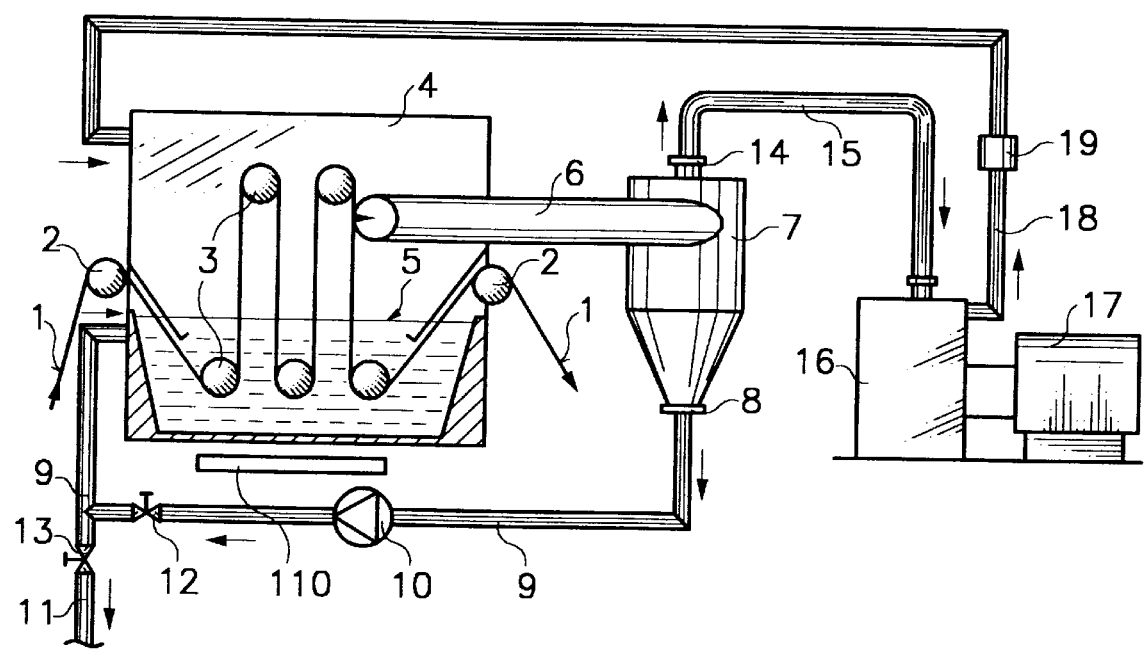
FIG. 1 is a schematic view of diagram of the apparatus components.

According to the present invention there is provided for an apparatus for a treatment of an endless web of fabric with a washing liquid comprising a treatment machine 4 for the treatment of an endless web of fabric. The endless web of fabric is led over rollers 2, 3 and through the treatment machine 4 furnished with a heated treatment medium 5. The generated gas-liquid mixture is withdrawn from the endless web of fabric and is separated. A line 6 is connected to a gas-liquid separator 7 for discharging the gas-liquid mixture. The gas-liquid separator 7 is furnished in its head 14 with a gas discharge line 15 and in the floor 8 with a liquid line 9. The gas discharge line 15 is connected to a vacuum generator 16. The liquid line 9 furnished with a pump 10 is connected to the treatment machine 4. A gas return line 18 is disposed between the vacuum generator 16 and the treatment machine 4.

The treatment machine can be a washing machine. The gas return line 18, returned to the treatment machine 4, can be furnished with a branch line 20 and be led by way of a perforated pipe 20a into the treatment medium 5. The gas return line 18 can be entered above the treatment medium 5 into the treatment machine 4.

A branch line 20 can be branched off from the gas return line 18. The branch line 20 can be entered through a perforated tube 20a into the floor of a heat exchanger 21. The heat exchanger can be furnished with a fresh water feed 22. The heat exchanger 21 can be furnished with a distributor plate 23 with openings. A discharge line 24 for hot liquid can be furnished in an area of the distributor plate 23.

An exhaust line 25 is furnished above the distributor plate 23 and led into the outside open air.

The distributor plate 23 can be furnished with uniformly distributed perforation openings of a diameter of from about 0.05 to 2.00 mm.

The gas return line 18 can be furnished with a sound absorber 19.

The heat exchanger 21 can be furnished with an exhaust line 25. The exhaust line 25 can be connected to the gas return line 18 through a branch line 28.

According to the present invention, there is also provided for a method for a treatment of an endless web of fabric, in particular for washing a continuous textile web, with a heated treatment medium. A generated gas-liquid mixture is withdrawn from a treatment zone with a vacuum generator. A gas phase contained in the withdrawn treatment medium is separated and the remaining treatment liquid is returned into the treatment zone. The gas-liquid mixture, generated above the treatment medium, is separated into a gas phase and a liquid phase outside of the treatment zone. The separated liquid phase is pumped back into the treatment zone. The remaining gas phase is led through a vacuum generator and is then returned into the treatment zone.

The gas phase withdrawn from the vacuum generator can be entered into the treatment medium of the treatment zone.

At least a part of the gas phase withdrawn from the vacuum generator can be entered into a heat exchanger furnished with a water feed. At least a part of the thereby generated hot liquid can be fed to a user. At least part of a generated discharge and exhaust air can be discharged into the outside open air.

All of the gas phase withdrawn from the vacuum generator can be entered into the heat exchanger furnished with a water feed. All of the generated hot liquid can be fed to a user or into the treatment zone. All of the generated discharge and exhaust air can be discharged into the outside open air.

At least a part of the gas phase withdrawn from the vacuum generator can be entered into a heat exchanger furnished with a water feed. At least a part of the thereby generated hot liquid can be fed into the treatment zone, and at least part of the generated discharge and exhaust air can be discharged into the outside open air.

The gas phase withdrawn from the vacuum generator can be led through a sound absorber.

An endless web of fabric 1 is led over rollers 2 and 3 through a washing machine 4 and is washed with the heated washing liquid 5 contained in the washing machine 4.

Endless webs of fabric or continuous webs of material are planar assemblies of textile fibers, produced by an interweaving or meshing of spun materials or of yarns or by individual fibers held together by interlocking in a random web, so-called non-wovens.

Non-woven fabrics are planar assemblies of textile fibers held together either by mechanical interlocking in a random web or mat, by fusing (in the case of thermoplastic fibers), or by bonding with a cementing medium such as starch, glue, casein, rubber latex or one of the cellulose derivatives or synthetic resins. The fibers may be preferentially oriented in one direction or may be deposited in a random manner. This web or sheet of fibers is then bonded together with an adhesive of one of several types or by inclusion of certain thermoplastic synthetic fibers.

A woven fabric is one composed of two basic series of yarn, warp and filling. Weaving is the interlacing of these yarns to form a fabric and the specific manner in which the two sets of yarns are interlaced determines the weave.

The heating device 110 can be disposed below a bath for washing. The generated hot gas-water mixture is withdrawn with a vacuum from the endless web of fabric 1 through a suction line 6 and is fed tangentially into a gas-liquid separating device, such as a cyclone 7. The gas and the liquid are separated by a centrifugal effect in the cyclone 7 based on a tangential flowing in of the gas-liquid mixture. Another type of gas-liquid separating device is furnished by an impact plate water removing device, where the gas and the liquid are separated by a deflection effect. Another possibility of separating gas from liquid is where the gas-liquid mixture in a large-volume vessel is separated by the reduction of the flow speed upon entry of the mixture from the line into the vessel.

The gas is separated from the water in the cyclone 7. The separated water is withdrawn through a floor port 8 from the cyclone 7 and is fed through a line 9 with a pump 10 into the washing machine 4. If required, a part of the separated water can be fed to a further user. A branch line 11 as well as valves 12 and 13 are furnished for this purpose. The gas separated from the water in the cyclone 7 is withdrawn through a head port 14 from the cyclone 7 and is led through a gas discharge line 15 into a vacuum generator 16 with a drive 17. The gas additionally heated in the vacuum generator 16 is returned through a gas return line 18 into the washing machine 4. If desired or required, a sound absorber 19 can be attached to the gas return line 18.

Figure 2:
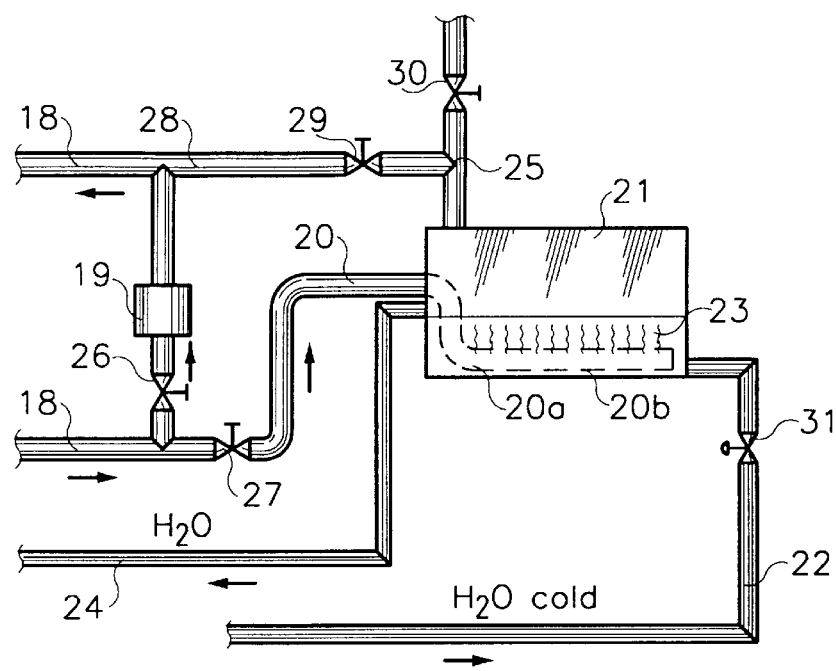
FIG. 2 is a view of a further feature of the present invention.

A part or the complete amount of gas, heated in the vacuum generator 16, is entered through a line 20 into the area of the floor of a heat exchanger 21 filled with water according to FIG. 2. A perforated pipe 20a, extending over the heat exchanger floor, is furnished with flow discharge nozzles 20b. Valves 26 and 27 allow a controlled distribution of gas into the heat exchanger 21 and the washing machine 4. Water, for example, fresh water, to be added to the process is led through a line 22 with a valve 31 into the heat exchanger 21. A distributor plate 23, having uniformly distributed perforation openings of a diameter of from about 0.05 to 2.00 mm, takes care of a very fine distribution of the gas in the water or fresh water to be added resulting in an optimum heat transfer from the gas to the water to be added. The diameter of the very finely distributed gas bubbles in the fresh water corresponds substantially to the diameter of the perforation openings in the distributor plate 23. The heated water is led by way of a line 24 either into the line 9 between the cyclone 7 and the pump 10 or directly into the washing machine 4 or to another user. In addition, the hot water with the returned liquid can be fed completely or in part through the branch line 11 to another user. The exhaust air present is led into the outside open air by the line 25. The exhaust air can also be led through a line 28 into the gas return line 18. The valves 29 and 30 take care of a corresponding distribution.

Figure 3:
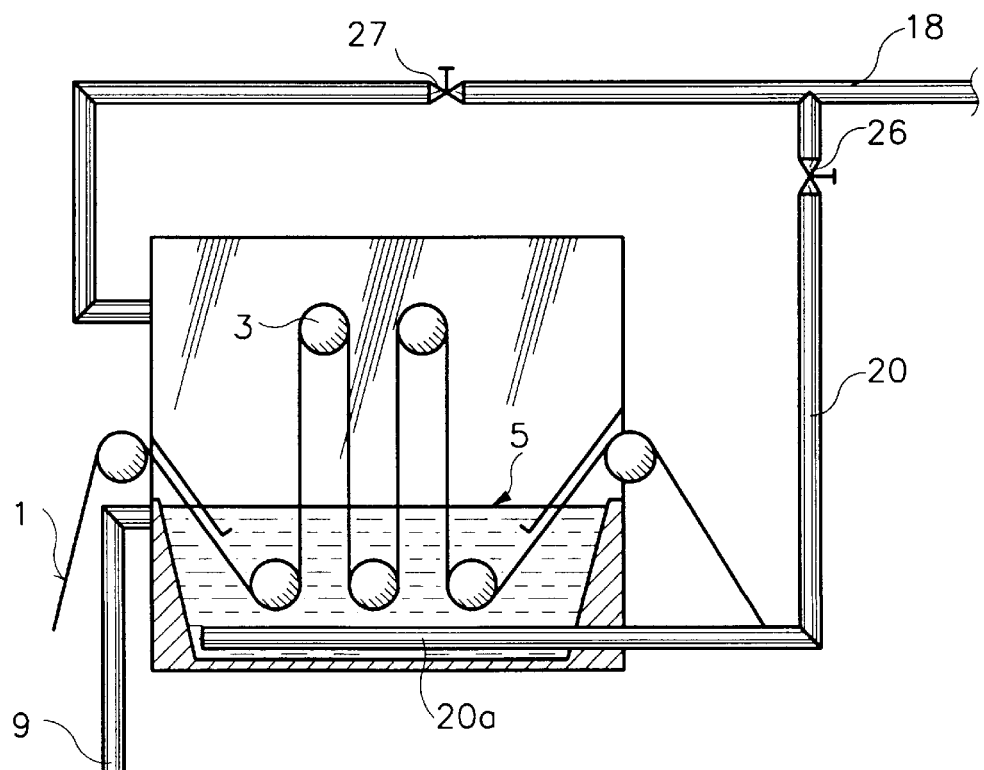
FIG. 3 is a view of yet another feature of the present invention.

FIG. 3 shows a further subdivision of the gas return line 18. Here again, a branch line 20 is furnished, which branch line 20 is entered through a perforated pipe 20a directly into the treatment medium 5 within the washing machine 4. The perforated pipe 20a is furnished over a length extending in the heat exchanger 21 with holes which are preferably uniformly or more or less uniformly distributed over the body of the perforated pipe 20a. The valves 26 and 27 take care of a controlled distribution. The valve 26 controls the flow into the perforated pipe 20a and the valve 27 controls the flow to the heat exchanger 21 or to the upper part of the washing machine.

The perforated pipe 20a has uniformly distributed openings having a diameter of from 2.0 to 5.00 mm. From about 4 to 16 openings are distributed over one square centimeter of the circumference of the perforated pipe 20a.

In case the valves 27 and 29 are closed and the valve 26 is open, then the gas leaving the vacuum generator 16 is returned completely into the washing machine 4 or, respectively, into the treatment medium 5. In case the valve 26 is closed and the valve 27 is open, then the gas is entered completely into the heat exchanger 21 or, respectively, into the upper part of the washing machine 4. The valves 26 and 27 can be automatically controlled such that parts of the gas are entered into the washing machine 4 or, respectively, into the heat exchanger 21. When the valve 30 is open and the valve 29 is closed, then the discharge and exhaust air is led completely into the outside open air. In case the valve 29 is open and the valve 30 is closed, then the exhaust air is led completely into the gas return line 18. The discharge or exhaust air can also be discharged in part through the line 25 and 28 in case of a corresponding automatic control of the valves 29, 30.

The washing liquid can be an aqueous solution of anionic and/or non-ionogenic surfaces of active substances, at times combined with substances which operate to form complexes, or only with water, either having a natural water hardness or softened through desalination or partial desalination or by ion exchange.

According to the present invention, the wash liquids preferably have a temperature from 30° C. to 100° C. at atmospheric pressure.

The washing machine 4 operates under atmospheric pressure. A pressure of 0.1 to 0.5 bar below 1 bar overpressure is present in the cyclone 7, in the suction line 6 and in the gas discharge line 15.

In the vacuum generator 16, there is present a pressure of 0.1 to 0.5 bar below 1 bar overpressure on the suction side and a pressure of 0.1 to 2.5 bar above 1 bar overpressure on the pressure side.

A pressure of 0.1 to 2.5 bar above 1 bar overpressure is present in the gas return line 18.

The pressures in the line 9 are from 0.1 to 0.8 bar underpressure or, respectively, from 0 to 2.4 bar overpressure and in the branch line 11 there is an atmospheric pressure.

An underpressure of from 0.1 to 0.8 is present at the suction side of the pump 10 and an overpressure of from 0 to 2.5 bar is present at the pressure side of the pump 10.

It is known in the state of the art to discharge the water vapors generated in the washing machine unused into the outside air. This is prevented according to the present invention by recovering the heat energy of these water vapors. For this purpose, the efficiency loss of the vacuum generator 16 is recovered in the method according to the present invention. As a further advantage, the energy, generated in the vacuum generator 16, can also be recovered by picking up the liquid-gas mixture, flowing through the vacuum generator 16, and feeding same for example into the heat exchanger 21. The thereby generated heat energy is recovered and returned into the washing machine.

It will be understood that each of the elements, or two or more together, may find a useful application in other types of methods and devices for the treatment of endless webs of fabric differing from the types described above.

While the invention has been illustrated and described as embodied in the context of a method and a device for the treatment of an endless web of fabric in a vacuum, it is not intended to be limited to the detail shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for a treatment of an endless web of fabric in a treatment zone, in particular for washing a continuous textile web, with a heated treatment medium, wherein a gas-liquid mixture is withdrawn from the endless web of fabric in a withdrawing treatment zone with a vacuum generator, wherein a phase gas contained in the gas-liquid mixture is separated, and wherein the remaining treatment liquid is returned into the treatment zone, wherein the gas-liquid mixture, generated during withdrawing the treatment medium from the endless web of fabric, is separated into a gas phase and a liquid phase outside of the treatment zone, wherein the separated liquid phase is pumped back into the treatment zone, and wherein the remaining gas phase is led through the vacuum generator and is then returned into the treatment zone.

2. The method according to claim 1, wherein the gas phase withdrawn from the vacuum generator is entered into the treatment medium of the treatment zone.

3. The method according to claim 1, wherein at least a part of the gas phase withdrawn from the vacuum generator is entered into a heat exchanger furnished with a water feed, wherein at least a part of the thereby generated hot liquid is fed outside of the treatment zone, and wherein at least part of a generated discharge and exhaust air is discharged into the outside open air.

4. The method according to claim 3, wherein all of the gas phase withdrawn from the vacuum generator is entered into the heat exchanger furnished with a water feed.

5. The method according to claim 3, wherein all of the generated hot liquid is fed outside of the treatment zone.

6. The method according to claim 3, wherein all of the generated discharge and exhaust air is discharged into the outside open air.

7. The method according to claim 1, wherein at least a part of the gas phase withdrawn from the vacuum generator is entered into a heat exchanger furnished with a water feed, wherein at least a part of the thereby generated hot liquid is fed into the treatment zone, and wherein at least part of the generated discharge and exhaust air is discharged into the outside open air.

8. The method according to claim 7, wherein all of the gas phase withdrawn from the vacuum generator is entered into the heat exchanger furnished with a water feed.

9. The method according to claim. 7, wherein all of the generated hot liquid is fed into the treatment zone.

10. The method according to claim 7, wherein all of the generated discharge and exhaust air is discharged into the outside open air.

11. The method according to claim 1, wherein the gas phase withdrawn from the vacuum generator is led through a sound absorber.

12. An apparatus for a treatment of an endless web of fabric with a washing liquid, comprising
   a treatment machine for the treatment of an endless web of fabric and furnished with a heated treatment medium, wherein the endless web of fabric is led over rollers and through the treatment machine, wherein a gas-liquid mixture, generated during the treatment, is withdrawn from the endless web of fabric and is separated,
   a line (6) disposed with a first end of the line (6) near the endless web of fabric,
   a gas-liquid separator (7) connected tangentially with a second end of the line (6) for discharging the gas-liquid mixture,
   a gas discharge line (15) furnished in a head of the gas-liquid separator (7),
   a liquid line (9) connected to the treatment machine (4) and furnished in a floor (8) of the gas-liquid separator (7),
   a vacuum generator (16) connected to the gas discharge line (15),
   a pump (10) furnished at the liquid line (9),
   a gas return line (18) disposed between the vacuum generator (16) and the treatment machine (4).

13. The apparatus according to claim 12, wherein the treatment machine is a washing machine, further comprising
   a branch line (20) furnished at the gas return line (18),
   a perforated pipe (20a) connected to the gas return line (18). wherein the gas return line (18) is returned to the treatment machine (4) and is led by way of the perforated pipe (20a) into the treatment medium (5), wherein the gas return line (18) is entered above the treatment medium (5) into the treatment machine (4).

14. The apparatus according to claim 12, further comprising a heat exchanger having a floor, a branch line (20) branched off from the gas return line (18) and entered through a perforated tube (20a) into the floor of the heat exchanger (21), a fresh water feed (22) furnished at the heat exchanger, a distributor plate (23) with openings furnished at the heat exchanger, a discharge line (24) for hot liquid furnished in an area of the distributor plate (23).

15. The apparatus according to claim 14, further comprising an exhaust line (25) furnished above the distributor plate (23) and led into the outside open air.

16. The apparatus according to claim 14, further comprising uniformly distributed perforation openings of a diameter of from about 0.05 to 2.00 mm furnished at the distributor plate (23).

17. The apparatus according to claim 12, further comprising a sound absorber (19) furnished at the gas return line (18).

18. The apparatus according to claim 14, further comprising an exhaust line (25) furnished at the heat exchanger (21), a branch line (28) furnished at the gas return line (18), wherein the exhaust line (25) is connectable to the gas return line (18) through the branch line (28).

19. A method for a treatment of an endless web of fabric and for washing a continuous textile web comprising treating an endless web of fabric with a heated treatment medium;

withdrawing the treatment medium from the endless web of fabric in a withdrawing treatment zone with a vacuum generator;

feeding a gas-liquid mixture generated during withdrawing the treatment medium from the endless web of fabric tangentially into a gas-liquid separating device;

separating the gas-liquid mixture, generated during withdrawing the treatment medium, into a gas phase and a remaining liquid phase in the gas-liquid separating device;

pumping the separated remaining liquid phase back into the treatment zone;

leading the remaining gas phase to the vacuum generator; and returning the remaining gas phase from the vacuum generator to the treatment zone.

20. An apparatus for a treatment of an endless web of fabric with a washing liquid, comprising guiding means including rollers for supporting an endless web of fabric;

a treatment machine disposed in a path of the guiding means and for treating the endless web of fabric, wherein the treatment machine is furnished with a heated treatment medium;

a first line disposed with a first end of the first line near the endless web of fabric;

a gas-liquid separator connected tangentially to a second end of the first line for separating the gas-liquid mixture into a gas phase and a remaining liquid phase;

a gas discharge line connected to a head of the gas-liquid separator;

a liquid line connected to the floor of the gas-liquid separator;

a vacuum generator connected to the gas discharge line;

a pump connected to the liquid line;

a second liquid line connected to the pump and to the treatment machine;

a gas return line connected to the vacuum generator and to the treatment machine.

21. The apparatus according to claim 20, wherein the treatment machine is a washing machine, further comprising a branch line connected to the gas return line;

a perforated pipe disposed in the treatment medium and connected to the gas return line, wherein the gas return line is entered above the treatment medium into the treatment machine;

a heat-exchanger having a floor;

a second branch line entering with a perforated tube into the floor of the heat exchanger;

a fresh water feed connected to the heat exchanger;

a distributor plate with openings furnished to the heat exchanger;

a discharge line for hot liquid and connected to the heat exchanger and furnished in an area of the distributor plate;

an exhaust line connected to the heat exchanger, located above the distributor plate and led into the outside open air.

22. The method according to claim 19, wherein at least a part of the gas phase, withdrawn from the vacuum generator, is entered into a heat exchanger furnished with a water feed, wherein at least a part of the thereby generated hot liquid is fed outside of the treatment zone, and wherein at least part of a generated discharge and exhaust air is discharged into the outside open air.

23. A method for a treatment of an endless web of fabric and for washing a continuous textile web in a washing machine including guiding means including rollers for supporting an endless web of fabric, a treatment machine disposed in a path of the guiding means and for treating the endless web of fabric, wherein the treatment machine is furnished with a heated treatment medium, a first fluid line disposed with a first end of the first fluid line near the endless web of fabric and connected to the treatment machine, a gas-liquid separator connected tangentially to a second end of the first fluid line for separating the gas-liquid mixture into a gas phase and a remaining liquid phase, a gas discharge line connected to a head of the gas-liquid separator, a liquid line connected to the floor of the gas-liquid separator, a vacuum generator connected to the gas discharge line;

a pump connected to the liquid line, a second liquid line connected to the pump and to the treatment machine, a gas return line connected to the vacuum generator and to the treatment machine;

comprising the steps treating an endless web of fabric with a heated treatment medium in the treatment machine;

withdrawing the treatment medium from the endless web of fabric in a withdrawing treatment zone with the vacuum generator;

feeding a gas-liquid mixture generated during withdrawing the treatment medium from the endless web of fabric tangentially into the gas-liquid separator;

separating the gas-liquid mixture, generated during withdrawing the treatment medium, into a gas phase and a remaining liquid phase in the gas-liquid separator;

pumping the separated remaining liquid phase back into the treatment zone;

leading the remaining gas phase to the vacuum generator; and returning the remaining gas phase from the vacuum generator to the treatment zone.

24. An apparatus for a treatment of an endless web of fabric with a washing liquid, comprising guiding means including rollers for supporting an endless web of fabric;

a treatment machine disposed in a path of the guiding means and for treating the endless web of fabric, wherein the treatment machine is furnished with a heated treatment medium for treating an endless web of fabric with the heated treatment medium;

a first fluid line disposed with a first end of the first fluid line near the endless web of fabric and connected to the treatment machine;

a gas-liquid separator connected tangentially to a second end of the first fluid line feeding a gas-liquid mixture generated during withdrawing the treatment medium from the endless web of fabric tangentially into a gas-liquid separating device and wherein said gas-liquid separator serves for separating the gas-liquid mixture generated during withdrawing the treatment medium, into a gas phase and a remaining liquid phase;

a gas discharge line connected to a head of the gas-liquid separator;

a liquid line connected to the floor of the gas-liquid separator;

a vacuum generator connected to the gas discharge line for withdrawing the treatment medium from the endless web of fabric in a withdrawing treatment zone with the vacuum generator and for leading the remaining gas phase from gas-liquid separator to the vacuum generator;

a pump connected to the liquid line for pumping the separated remaining liquid phase back into the treatment zone;

a second liquid line connected to the pump and to the treatment machine;

a gas return line connected to the vacuum generator and to the treatment machine for returning the remaining gas phase from the vacuum generator to the treatment zone.

25. The apparatus according to claim 20, wherein the treatment machine is a washing machine, further comprising a heating device disposed below the treatment machine for heating the treatment medium.

* * * * *